(12) United States Patent
Lin et al.

(10) Patent No.: US 8,009,960 B2
(45) Date of Patent: Aug. 30, 2011

(54) CYCLIC VIDEO RECORDING METHOD FOR AN OPTICAL STORAGE MEDIUM

(75) Inventors: Po-Wei Lin, Changhua (TW); Fong-Hwa Song, Tucheng (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 771 days.

(21) Appl. No.: 12/153,465

(22) Filed: May 20, 2008

(65) Prior Publication Data

US 2008/0292288 A1 Nov. 27, 2008

(30) Foreign Application Priority Data

May 22, 2007 (TW) .............................. 96118159 A

(51) Int. Cl.
*H04N 5/00* (2006.01)
(52) U.S. Cl. .......... 386/126; 386/68; 386/343; 386/344; 386/345
(58) Field of Classification Search ............ 386/68, 386/126, 343, 344, 345, 346, 347, 348, 349, 386/350, 351, 352; 369/83, 84, 85
See application file for complete search history.

(56) References Cited

U.S. PATENT DOCUMENTS

| 7,103,268 | B2 * | 9/2006 | Watanabe | 386/248 |
| 2004/0170379 | A1 * | 9/2004 | Yao et al. | 386/46 |

* cited by examiner

*Primary Examiner* — Vivek Srivastava
*Assistant Examiner* — Thong Truong
(74) *Attorney, Agent, or Firm* — Bacon & Thomas, PLLC

(57) ABSTRACT

In a cyclic video recording method for an optical storage medium, the optical storage medium is divided into a set of forward seeking sub-zones and a set of backward seeking sub-zones. Initial values of a current sub-zone and a flag are set. The flag indicates a direction to seek the sub-zones and the initial value of the flag is determined by the initial value of the current sub-zone. When the flag indicates a forward direction, it determines whether the current sub-zone is the last sub-zone. When the current sub-zone is not the last sub-zone, a next sub-zone in the forward direction is set to become the current sub-zone and the write operation is performed. When the current sub-zone is the last sub-zone, the flag is set to a backward direction, the last sub-zone is set to become the current sub-zone and the write operation is performed.

6 Claims, 3 Drawing Sheets

CYCLIC VIDEO RECORDING METHOD FOR AN OPTICAL STORAGE MEDIUM

BACKGROUND OF THE INVENTION

1. Field of the Invention

The present invention relates to the technical field of optical storages and, more particularly, to a cyclic video recording method for an optical storage medium and an optical storage using the same.

2. Description of Related Art

In various video recording applications such as monitor systems, the system has to sequentially record a video in real time on a limited storage space and also play the video. Thus, the prior art cyclically uses the limited storage space to store, query and playback the content recorded within a certain range of period from the present time.

Upon the features of high capacity, low price and popularity of an optical storage medium, the optical storage medium is very suitable for recording applications such as monitor systems. However, due to the read/write characteristics on the optical storage medium and the comparably longer mechanical seek time, it is limited and hard to implement the real-time sequential recording and playback by using the optical storage medium cyclically.

In the prior art, a write operation is performed on the optical storage medium for sequentially recording video data from low to high addresses. For the physical mechanical movement of the pickup of an optical storage, such a write operation is performed by the optical storage on the optical storage medium from the inner circle to the outer circle. When the limited space on the optical storage medium is cyclically used, the write operation suffers the problem of discontinuous recording. As shown in FIG. 1, when a write operation on the optical storage medium 110 reaches to the highest address LBAmax, the optical storage re-locates a writing position by drawing the pickup 120 from the highest address LBAmax to the lowest address LBAmin. Namely, the pickup 120 is moved on the optical storage medium 110 from the outer edge to the inner edge and continues the write operation at the lowest address LBAmin to thereby obtain the cyclic space usage. When the optical storage is drawing the pickup 120 from the outer edge to the inner edge, it performs a long seek operation. The long seek operation performs a mechanical action and associated adjustments on the pickup 120. Such a mechanical action takes much time. Similarly, the discontinuousness of recorded images is met when the write operation cyclically records the images on the optical storage medium.

To overcome the discontinuousness problem, the prior art increases the amount of buffers to the optical storage in order to temporarily store the recording images. However, such a manner relatively increases the hardware cost of the optical storage. In addition, when the pickup 120 reaches to the highest address LBAmax during a playback, the optical storage has to draw the pickup 120 from the highest address LBAmax to the lowest address LBAmin, which similarly produces the discontinuousness.

Therefore, it is desirable to provide an improved video recording method to mitigate and/or obviate the aforementioned problems.

SUMMARY OF THE INVENTION

An object of the present invention is to provide a cyclic video recording method for an optical storage medium and an optical storage using the same, which can reduce the amount of buffers used in the optical storage to thereby reduce the hardware cost.

Another object of the present invention is to provide a cyclic video recording method for an optical storage medium and an optical storage using the same, which can improve the recorded image discontinuousness produced by the cyclic recording in the prior art.

According to a feature of the invention, a cyclic video recording method for an optical storage medium is provided. The optical storage medium is divided into multiple sub-zones SB[1], SB[2], SB[3] ... SB[N] (for N a positive integer) which are grouped into a set of forward seeking sub-zones SB[1], SB[3], SB[5] . . . SB[NF] and a set of backward seeking sub-zones SB[2], SB[4], SB[6] ... SB[NB], wherein NF=N−1 and NB=N when N is an even number and NF=N and NB=N−1 when N is an odd number. The set of forward seeking sub-zones and the set of backward seeking sub-zones are distributed interleavingly. The cyclic video recording method includes the following steps: (A) setting initial values of a current sub-zone and a flag and performing a write operation, wherein the flag indicates a direction to seek the sub-zones and the initial value of the flag is determined by the initial value of the current sub-zone; (B) determining whether the flag indicates a forward direction, and further determining whether the current sub-zone is not the last sub-zone SB[NF] in the set of forward seeking sub-zones when the flag indicates the forward direction; (C) setting a next sub-zone in the set of forward seeking sub-zones to become the current sub-zone and performing the write operation when step (B) determines that the current sub-zone is not the last sub-zone SB[NF] in the set of forward seeking sub-zones, and returning to repeat step (B); (D) setting the flag to a backward direction, setting the last sub-zone SB[NB] in the set of backward seeking sub-zones to become the current sub-zone and performing the write operation when step (B) determines that the current sub-zone is the last sub-zone SB[NF] in the set of forward seeking sub-zones, and returning to repeat step (B); (E) determining whether the current sub-zone is not the lowest sub-zone SB[2] in the set of backward seeking sub-zones when step (B) determines that the flag does not indicate the forward direction; and (F) setting a previous sub-zone in the set of backward seeking sub-zones to become the current sub-zone and performing the write operation when the current sub-zone is not the lowest sub-zone SB[2] in the set of backward seeking sub-zones, and returning to repeat step (B).

According to another feature of the invention, an optical storage with a program to provide a cyclic video recording method is provided. The optical storage uses an optical head to produce spots which form an optical trace on an optical disk for recording information to be stored in multiple data tracks of the optical disk. The optical disk is divided into multiple sub-zones SB[1], SB[2], SB[3] ... SB[N] (for N a positive integer) which are grouped into a set of forward seeking sub-zones SB[1], SB[3], SB[5] ... SB[NF] and a set of backward seeking sub-zones SB[2], SB[4], SB[6] . . . SB[NB], wherein NF=N−1 and NB=N when N is an even number and NF=N and NB=N−1 when N is an odd number. The set of forward seeking sub-zones and the set of backward seeking sub-zones are distributed interleavingly. The cyclic video recording method provided by the program includes the following steps: (A) setting initial values of a current sub-zone and a flag and performing a write operation, wherein the flag indicates a direction to seek the sub-zones and the initial value of the flag is determined by the initial value of the current sub-zone; (B) determining whether the flag indicates a forward direction, and further determining whether the current sub-zone is not the last sub-zone SB[NF] in the set of forward seeking sub-zones when the flag indicates the forward direction; (C) setting a next sub-zone in the set of forward seeking sub-zones to become the current sub-zone and performing the write operation when step (B) determines that the current sub-zone is not the last sub-zone SB[NF] in the set of forward seeking sub-zones, and returning to repeat step (B); (D) setting the flag to a backward direction, setting the last sub-zone SB[NB] in the set of backward seeking sub-zones to become the current sub-zone and performing the write operation when step (B) determines that the current sub-zone is the last sub-zone SB[NF] in the set of forward seeking sub-zones, and returning to repeat step (B); (E) determining whether the current sub-zone is not the lowest sub-zone SB[2] in the set of backward seeking sub-zones when step (B) determines that the flag does not indicate the forward direction; and (F) setting a previous sub-zone in the set of backward seeking sub-zones to become the current sub-zone and performing the write operation when the current sub-zone is not the lowest sub-zone SB[2] in the set of backward seeking sub-zones, and returning to repeat step (B).

Other objects, advantages, and novel features of the invention will become more apparent from the following detailed description when taken in conjunction with the accompanying drawings.

DETAILED DESCRIPTION OF THE PREFERRED EMBODIMENT

Figure 1:
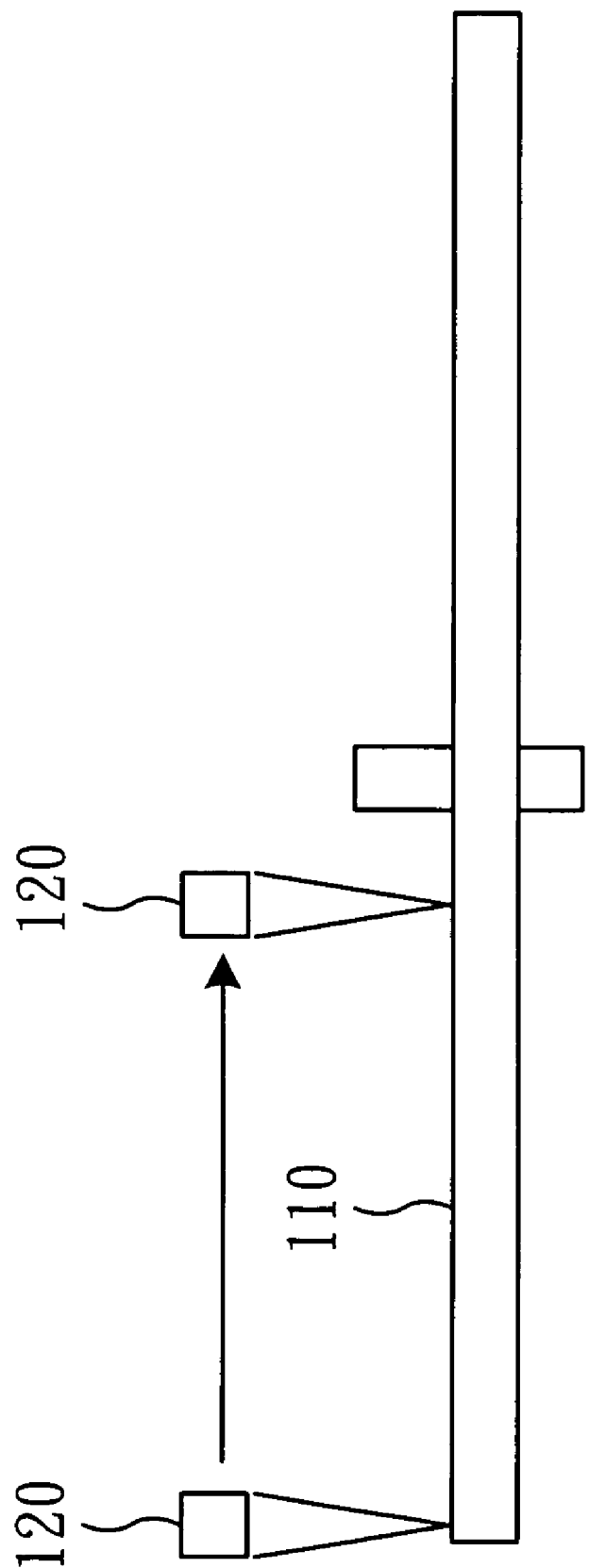
FIG. 1 is a schematic graph of a typical pickup drawn from the highest address to the lowest address on an optical disk at the writing position.
Figure 2:
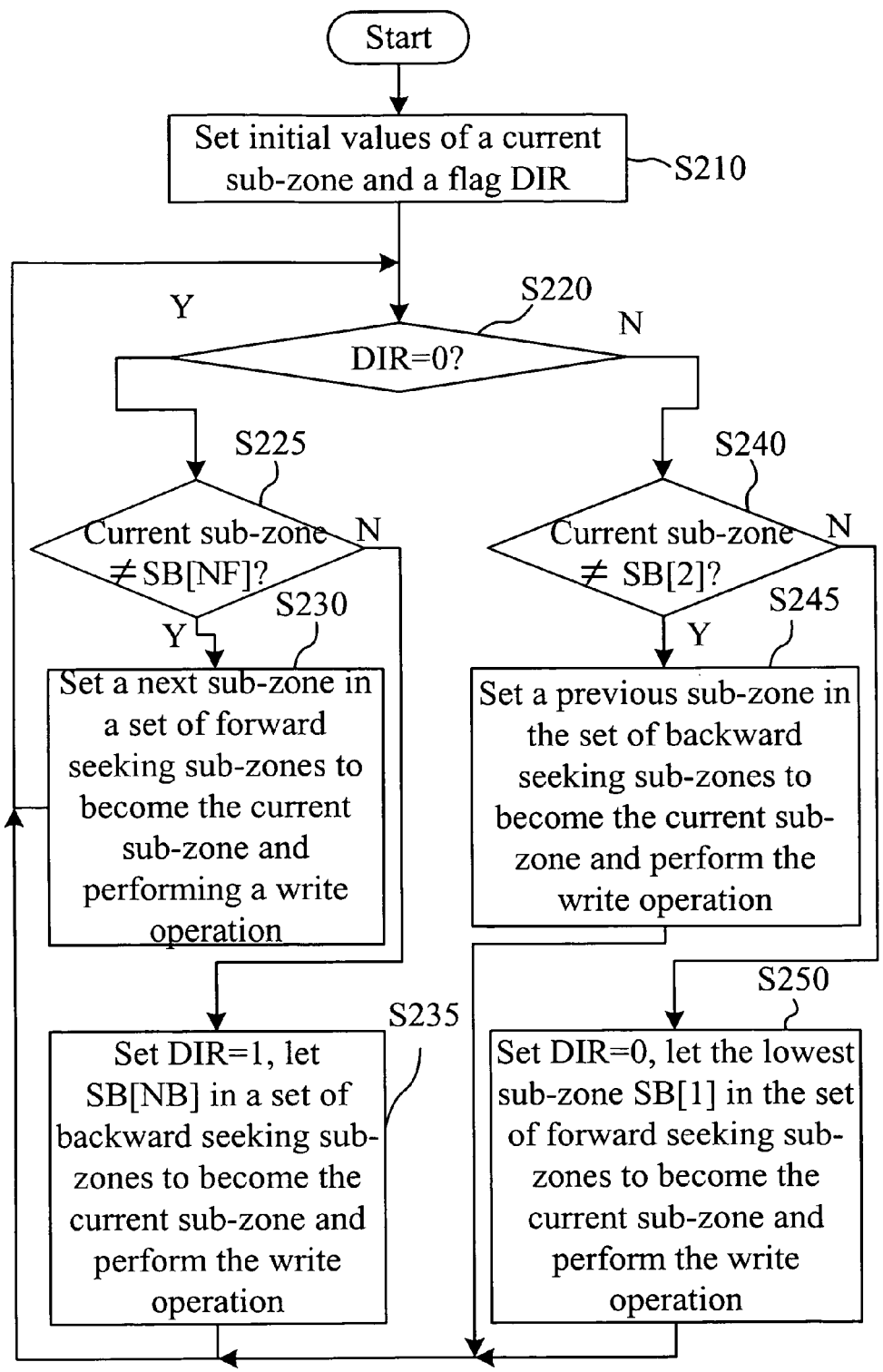
FIG. 2 is a flowchart of a cyclic video recording method for an optical storage medium according to the invention.

FIG. 2 is a flowchart of a cyclic video recording method for an optical storage medium according to the invention. The optical storage medium is divided into multiple sub-zones SB[1], SB[2], SB[3] . . . SB[N] (for N a positive integer) which have a size equal to a block at least. The block equals to smallest units to be written by various recording media or disks. For example, the block can be one selected from a group of 2352 bytes/block, 2048 bytes/block and 2336 bytes/block. The multiple sub-zones are further grouped into a set of forward seeking sub-zones SB[1], SB[3], SB[5] . . . SB[NF] and a set of backward seeking sub-zones SB[2], SB[4], SB[6] . . . SB[NB], wherein NF=N−1 and NB=N when N is an even number and NF=N and NB=N−1 when N is an odd number. The set of forward seeking sub-zones and the set of backward seeking sub-zones are distributed interleavingly.

At first, step S210 finds initial values of a current sub-zone and a flag DIR. When DIR=0, it indicates a forward direction, and when DIR=1, it indicates a backward direction. The flag indicates a direction to seek the sub-zones, and the initial value of the flag is determined by the initial value of the current sub-zone. When the initial value of the current sub-zone indicates to forward seeking sub-zones, the initial value of the flag DIR is set to zero. On the other hand, when the initial value of the current sub-zone indicates to backward seeking sub-zones, the initial value of the flag DIR is set to one.

Step S220 determines whether the flag indicates a forward direction; if yes, step S225 is executed, and otherwise step S240 is executed. Step S225 further determines whether the current sub-zone is not the last sub-zone SB[NF] in the set of forward seeking sub-zones.

In step S225, when it is determined that the current sub-zone is not the last sub-zone SB[NF] in the set of forward seeking sub-zones, a next sub-zone in the set of forward seeking sub-zones is set to become the current sub-zone and accordingly the write operation is performed. Next, the procedure returns to step S220 for execution.

In step S225, when it is determined that the current sub-zone is the last sub-zone SB[NF] in the set of forward seeking sub-zones, the flag is set to a backward direction, i.e., DIR=1, the last sub-zone SB[NB] in the set of backward seeking sub-zones is set to become the current sub-zone and accordingly the write operation is performed (step S235). Next, the procedure returns to step S220 for execution.

Step S240 further determines whether the current sub-zone is not the lowest sub-zone SB[2] in the set of backward seeking sub-zones.

When step S240 determines that the current sub-zone is not the lowest sub-zone SB[2] in the set of backward seeking sub-zones, a previous sub-zone in the set of backward seeking sub-zones is set to become the current sub-zone and accordingly the write operation is performed (step S245). Next, the procedure returns to step S220 for execution.

When step S240 determines that the current sub-zone is the lowest sub-zone SB[2] in the set of backward seeking sub-zones, the flag is set to the forward direction, the lowest sub-zone SB[1] in the set of forward seeking sub-zones is set to become the current sub-zone and accordingly the write operation is performed (step S250). Next, the procedure returns to step S220 for execution.

Figure 3:
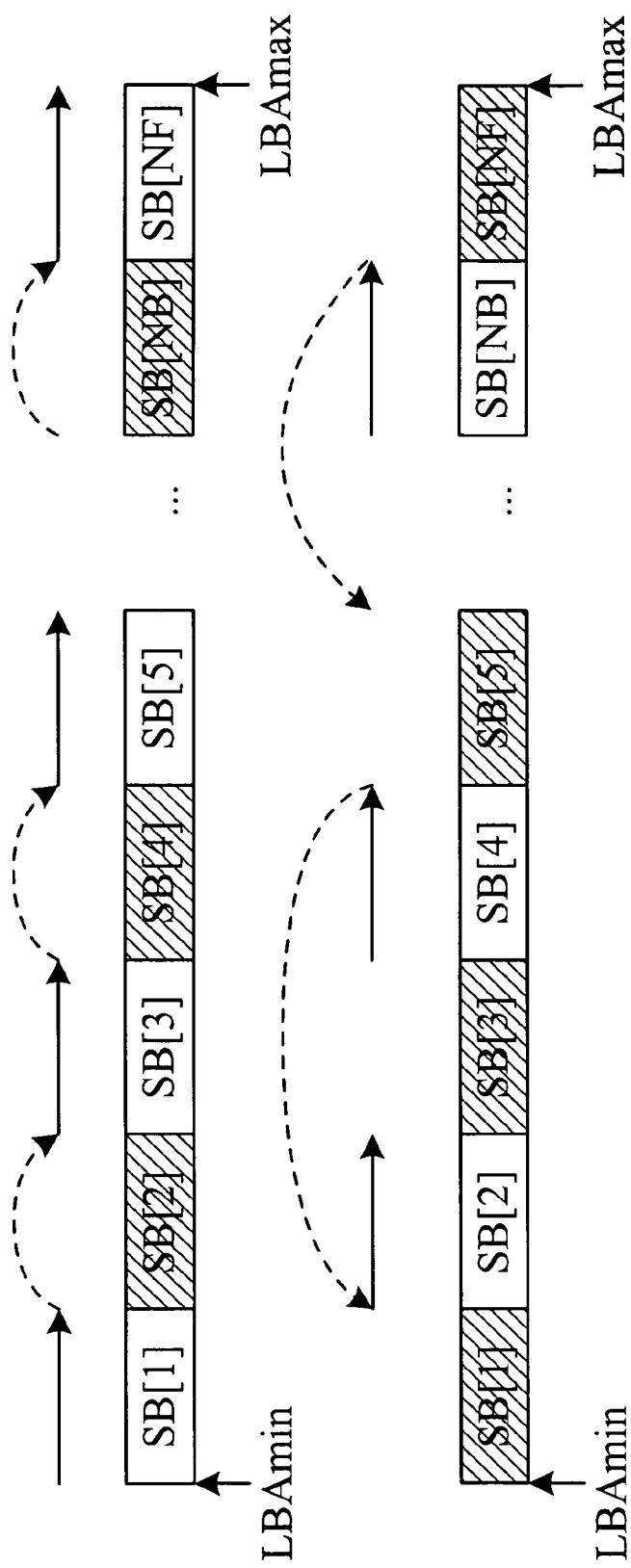
FIG. 3 is a schematic diagram of a cyclic video recording according to the invention.

As shown in FIG. 3, for cyclic video recording, the invention initially seeks the set of forward seeking sub-zones (SB [1], SB[3], SB[5] . . . SB[NF]) and performs a write operation from the position LBAmin to the position LBAmax. In this case, the forward seek is proceeded only to the sub-zones in the set of forward seeking sub-zones, not reaching to the sub-zones in the set of backward seeking sub-zones. In this embodiment, the initial value of the current sub-zone is set to the sub-zone SB[1] in the set of forward seeking sub-zones, which is for description only. In other embodiments, the initial value of the current sub-zone can be any, such as SB[3] or SB[NB], selected from the set of forward or backward seeking sub-zones.

When the write operation completes the position LBAmax in the set of forward seeking sub-zones, the write operation is continuously performed on the set of backward seeking sub-zones from the position LBAmax to the position LBAmin (S B [NB] . . . SB [4], SB [2]). Likewise, in this case, the backward seek is proceeded only to the sub-zones in the set of backward seeking sub-zones, not reaching to the sub-zones in the set of forward seeking sub-zones, until the pickup 120 returns to the position LBAmin in the set of backward seeking sub-zones.

The aforementioned steps can be implemented in a program with a programming language for execution in the optical storage. The optical storage uses an optical pickup head to produce spots which form an optical trace on an optical disk for recording information to be stored in the data tracks of the optical disk. Accordingly, the optical storage can cyclically use the optical storage space without increasing the additional buffers and producing the discontinuousness of recorded images. The program can be stored in any recording medium which is recognizable and readable by a microprocessor or device which includes the recording medium. The device can be a hard disk, floppy disk, optical disk, ZIP, MO, IC, RAM, or the like that can be used by one who is skilled in the art. Since the cyclic video recording method of the invention is completely disclosed as the aforementioned, one skilled in the programming language can accordingly code the program, so the coding detail is no more described.

As cited, the invention can divide a typical long seek from position LBAmax to position LBAmin in a cyclic video recording process into several short seeks which are optimally divided to avoid the additional buffers in the prior art and gain the satisfied short time in seeking. Thus, cyclically using optical storage space is achieved.

Although the present invention has been explained in relation to its preferred embodiment, it is to be understood that many other possible modifications and variations can be made without departing from the spirit and scope of the invention as hereinafter claimed.

What is claimed is:

1. A cyclic video recording method for an optical storage medium, the optical storage medium being divided into multiple sub-zones which are grouped into a set of forward seeking sub-zones SB[1], SB[3], SB[5] . . . SB[NF] and a set of backward seeking sub-zones SB[2], SB[4], SB[6] . . . SB[NB], wherein NF=N−1 and NB=N when N is an even number and NF=N and NB=N−1 when N is an odd number, and the set of forward seeking sub-zones and the set of backward seeking sub-zones are distributed interleavingly, the method comprising the steps of:
   (A) setting an initial values of current sub-zone and an initial value of flag and performing a write operation, wherein the flag indicates a direction to seek the sub-zones and the initial value of the flag is determined by the initial value of the current sub-zone;
   (B) determining whether the flag indicates a forward direction, and further determining whether the current sub-zone is not the last sub-zone SB[NF] in the set of forward sub-zones when the flag indicates the forward direction;
   (C) setting a next sub-zone in the set of forward seeking sub-zones to become the current sub-zone and performing the write operation when the current sub-zone is not the last sub-zone SB[NF] in the set of forward seeking sub-zones, and returning to repeat step (B);
   (D) setting the flag to a backward direction, setting the last sub-zone SB[NB] in the set of backward seeking sub-zones to become the current sub-zone and performing the write operation when the current sub-zone is the last sub-zone SB[NF] in the set of forward seeking sub-zones, and returning to repeat step (B);
   (E) determining whether the current sub-zone is not the lowest sub-zone SB[2] in the set of backward seeking sub-zones when step (B) determines that the flag does not indicate the forward direction; and
   (F) setting a previous sub-zone in the set of backward seeking sub-zones to become the current sub-zone and performing the write operation when the current sub-zone is not the lowest sub-zone SB[2] in the set of backward seeking sub-zones, and returning to repeat step (B).

2. The method as claimed in claim 1, further comprising the step of:
   (G) setting the flag to the forward direction, setting the lowest sub-zone SB[1] in the set of forward seeking sub-zones to become the current sub-zone and performing the write operation when the current sub-zone is the lowest sub-zone SB[2] in the set of backward seeking sub-zones.

3. The method as claimed in claim 1, wherein each sub-zone has a size at least equal to the smallest unit to be written by various recording media or disk.

4. A cyclic video recording method for an optical storage, the optical storage using an optical pickup head to produce spots which form an optical trace on an optical disk for recording information to be stored in multiple data tracks of the optical disk, the optical disk being divided into multiple sub-zones which are grouped into a set of forward seeking sub-zones SB[1], SB[3], SB[5] . . . SB[NF] and a set of backward seeking sub-zones SB[2], SB[4], SB[6] . . . SB[NB], wherein NF=N−1 and NB=N when N is an even number or NF=N and NB=N−1 when N is an odd number, and the set of forward seeking sub-zones and the set of backward seeking sub-zones are distributed interleavingly, the optical storage for cyclic video recording comprising the steps of:
   (A) setting an initial value of current sub-zone and an initial value of flag and performing a write operation, wherein the flag indicates a direction to seek the sub-zones and the initial value of the flag is determined by the initial value of the current sub-zone;
   (B) determining whether the flag indicates a forward direction, and further determining whether the current sub-zone is the last sub-zone SB[NF] in the set of forward seeking sub-zones when the flag indicates the forward direction;
   (C) setting a next sub-zone in the set of forward seeking sub-zones to become the current sub-zone and performing the write operation when the current sub-zone is not the last sub-zone SB[NF] in the set of forward seeking sub-zones, and returning to repeat step (B);
   (D) setting the flag to a backward direction, setting the last sub-zone SB[NB] in the set of backward seeking sub-zones to become the current sub-zone and performing the write operation when the current sub-zone is the last sub-zone SB[NF] in the set of forward seeking sub-zones, and returning to repeat step (B);
   (E) determining whether the current sub-zone is not the lowest sub-zone SB[2] in the set of backward seeking sub-zones when step (B) determines that the flag does not indicate the forward direction; and
   (F) setting a previous sub-zone in the set of backward seeking sub-zones to become the current sub-zone and performing the write operation when the current sub-zone is not the lowest sub-zone SB[2] in the set of backward seeking sub-zones, and returning to repeat step (B).

5. The optical storage as claimed in claim 4, wherein the cyclic video recording method provided by the program further comprises the step of:
   (G) setting the flag to the forward direction, setting the lowest sub-zone SB[1] in the set of forward seeking sub-zones to become the current sub-zone and performing the write operation when the current sub-zone is the lowest sub-zone SB[2] in the set of backward seeking sub-zones.

6. The cyclic video recording method as claimed in claim 4, wherein each sub-zone has a size at least equal to the smallest unit to be written by various recording media or disk.

* * * * *